United States Patent
Schwarz et al.

(10) Patent No.: US 11,951,604 B2
(45) Date of Patent: Apr. 9, 2024

(54) POWER TOOLS AND POWER TOOLS PLATFORM

(71) Applicant: Black & Decker Inc., New Britain, CT (US)

(72) Inventors: Daniel L. Schwarz, Timonium, MD (US); Patrick J. Tilson, Towson, MD (US); Ethan L. Helmer, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/942,609

(22) Filed: Sep. 12, 2022

(65) Prior Publication Data

US 2023/0001562 A1 Jan. 5, 2023

Related U.S. Application Data

(63) Continuation of application No. 17/515,921, filed on Nov. 1, 2021, which is a continuation of application No. 16/941,154, filed on Jul. 28, 2020.
(Continued)

(51) Int. Cl.
*B25F 5/02* (2006.01)
*B05C 17/005* (2006.01)
(Continued)

(52) U.S. Cl.
CPC .......... *B25F 5/02* (2013.01); *B05C 17/00523* (2013.01); *B25F 3/00* (2013.01);
(Continued)

(58) Field of Classification Search
CPC .... B25F 5/02; B25F 3/00; B25F 5/00; H01M 50/20; H01M 2220/30; H01M 50/247;
(Continued)

(56) References Cited

U.S. PATENT DOCUMENTS

| 568,539 A | 9/1896 | McCoy |
| 762,650 A | 6/1904 | O |

(Continued)

FOREIGN PATENT DOCUMENTS

| CN | 2042568 U | 8/1989 |
| CN | 200984676 Y | 12/2007 |

(Continued)

OTHER PUBLICATIONS

Black & Decker CI500S Dual Temperature Soldering and Craft Iron—https://us.amazon.com/Black-Decker-CI500S-Dual-Temperature-Soldering-and-Craft-Iron/dp/B000BASSKI; (1) First Available Date listed as Jul. 7, 2011; Website Accessed Aug. 19, 2020.

(Continued)

*Primary Examiner* — M Baye Diao
(74) *Attorney, Agent, or Firm* — Stephen R. Valancius

(57) ABSTRACT

A power tool system includes a removable battery pack a first tool and a second tool. The first tool includes a first base housing that is selectively engageable with the removable battery pack and a first tool portion connected to the first base housing by a first connecting section. The second tool includes a second base housing that is selectively engageable with the removable battery pack and a second tool portion connected to the second base housing by a second connecting section. The second tool base housing houses a second controller that provides a proportional power delivery system for the second tool and second tool base housing also includes a second actuator for providing user control of the second tool.

20 Claims, 6 Drawing Sheets

Related U.S. Application Data

(60) Provisional application No. 62/884,309, filed on Aug. 8, 2019.

(51) Int. Cl.

| | | |
|---|---|---|
| *B23K 3/03* | (2006.01) | |
| *B25F 3/00* | (2006.01) | |
| *F04D 25/06* | (2006.01) | |
| *H01M 50/20* | (2021.01) | |
| *H01M 50/247* | (2021.01) | |
| *H01M 50/284* | (2021.01) | |
| *F21L 4/04* | (2006.01) | |

(52) U.S. Cl.
CPC ......... *H01M 50/20* (2021.01); *H01M 50/247* (2021.01); *H01M 50/284* (2021.01); *B23K 3/0323* (2013.01); *F04D 25/0673* (2013.01); *F21L 4/04* (2013.01); *H01M 2220/30* (2013.01)

(58) Field of Classification Search
CPC ................ H01M 50/284; Y02E 60/10; B05C 17/00523; B23K 3/0323; F04D 25/0673; F21L 4/04
USPC ........................................................ 320/107
See application file for complete search history.

(56) References Cited

U.S. PATENT DOCUMENTS

| | | | |
|---|---|---|---|
| 1,470,197 A | 10/1923 | Ryther | |
| 2,040,517 A | 5/1936 | Kopsch | |
| 2,056,951 A | 10/1936 | Bohall et al. | |
| 2,413,422 A | 12/1946 | Teige et al. | |
| 2,591,287 A | 4/1952 | Pellar et al. | |
| 2,682,413 A | 6/1954 | Tripp | |
| 2,777,703 A | 1/1957 | Pickett et al. | |
| 3,247,360 A | 4/1966 | Ponder | |
| 3,287,541 A | 11/1966 | Weller et al. | |
| 3,430,816 A | 3/1969 | Nadherny et al. | |
| 3,480,759 A | 11/1969 | Ernst et al. | |
| 3,697,724 A | 10/1972 | Hombrecher | |
| 3,706,871 A | 12/1972 | Witherow | |
| 3,712,633 A | 1/1973 | Schadlich | |
| 3,984,655 A | 10/1976 | Wahl | |
| 4,050,003 A | 9/1977 | Owings et al. | |
| 4,671,476 A | 6/1987 | Yim | |
| 4,826,049 A | 5/1989 | Speer | |
| D304,368 S | 10/1989 | Suzuki | |
| D308,932 S | 7/1990 | Straub | |
| 5,446,262 A | 8/1995 | McCambridge | |
| 5,495,093 A | 2/1996 | Griffith | |
| 5,780,819 A | 7/1998 | Fabrikant et al. | |
| 5,811,766 A | 9/1998 | Fabrikant et al. | |
| 5,831,245 A | 11/1998 | Debourg et al. | |
| 6,007,373 A | 12/1999 | Chew | |
| 6,215,104 B1 | 4/2001 | Kurpiela et al. | |
| 6,260,985 B1 | 7/2001 | Zeller | |
| 6,286,609 B1* | 9/2001 | Carrier .................... | H02P 7/291 173/217 |
| 6,417,894 B1 | 7/2002 | Goff et al. | |
| 6,502,949 B1 | 1/2003 | Horiyama et al. | |
| 6,527,143 B1 | 3/2003 | Schomäcker | |
| 6,575,590 B1 | 6/2003 | Wadsworth | |
| 6,641,145 B1 | 11/2003 | Nebe et al. | |
| 6,646,228 B2 | 11/2003 | Axinte et al. | |
| 6,797,924 B1 | 9/2004 | Axinte et al. | |
| 6,820,768 B2 | 11/2004 | Belanger | |
| 7,064,520 B2 | 6/2006 | Heigl et al. | |
| D536,718 S | 2/2007 | Murray | |
| 7,222,986 B2 | 5/2007 | Mah | |
| 7,291,809 B2 | 11/2007 | Shigekawa | |
| 7,497,275 B2* | 3/2009 | Brotto .................... | B25D 17/00 173/171 |
| 7,557,536 B2 | 7/2009 | Lobert et al. | |
| 7,578,598 B2 | 8/2009 | Robinson et al. | |
| 7,621,652 B2 | 11/2009 | Zick | |
| 7,733,054 B2* | 6/2010 | Phillips ............... | H01M 10/613 320/112 |
| 7,745,760 B2 | 6/2010 | Shigekawa | |
| 7,942,617 B2 | 5/2011 | Allemann et al. | |
| 8,002,432 B2 | 8/2011 | Chen et al. | |
| 8,056,764 B2 | 11/2011 | Paasch et al. | |
| 8,222,868 B2 | 7/2012 | Buckner et al. | |
| 8,446,120 B2 | 5/2013 | Forster et al. | |
| 8,606,540 B2 | 12/2013 | Haisty et al. | |
| 8,708,346 B2 | 4/2014 | Harrison et al. | |
| 8,842,427 B2 | 9/2014 | Yoshimura et al. | |
| 8,882,378 B2 | 11/2014 | Bylsma et al. | |
| 8,894,377 B2 | 11/2014 | Greenberg | |
| 8,984,711 B2 | 3/2015 | Ota et al. | |
| 9,205,497 B2 | 12/2015 | Harrison et al. | |
| 9,273,857 B2 | 3/2016 | Rosenbecker et al. | |
| 9,303,852 B2 | 4/2016 | Staeubli et al. | |
| 9,539,691 B2 | 1/2017 | Hirschburger | |
| 9,583,745 B2 | 2/2017 | White et al. | |
| 9,583,746 B2 | 2/2017 | Ota et al. | |
| 9,620,989 B2 | 4/2017 | Meoli | |
| 9,878,432 B2 | 1/2018 | Linehan et al. | |
| 9,956,677 B2* | 5/2018 | Baskar .................... | B25F 3/00 |
| 10,005,147 B2 | 6/2018 | Zerweck et al. | |
| 10,039,367 B2* | 8/2018 | Yamaoka .................. | A47L 5/14 |
| 10,056,582 B2 | 8/2018 | White et al. | |
| 10,131,042 B2 | 11/2018 | Mergener et al. | |
| 10,131,043 B2 | 11/2018 | Mergener et al. | |
| 10,213,908 B2 | 2/2019 | Mergener et al. | |
| 10,272,558 B2* | 4/2019 | Christophersen ....... | B24B 49/10 |
| 10,326,399 B2 | 6/2019 | Hirschburger | |
| 10,350,746 B2 | 7/2019 | Martinez et al. | |
| 10,404,709 B2 | 9/2019 | Borkowicz et al. | |
| 10,500,707 B2 | 12/2019 | Hirschburger | |
| 10,525,582 B2* | 1/2020 | Qiu ...................... | B23D 59/002 |
| 10,821,591 B2* | 11/2020 | Verbrugge ............. | B25B 21/02 |
| 10,897,149 B2* | 1/2021 | Byrne .................... | H01R 13/73 |
| 10,903,781 B2 | 1/2021 | Levin | |
| 11,465,268 B2 | 10/2022 | Zhu et al. | |
| 2002/0129949 A1 | 9/2002 | Bongers-Ambrosius et al. | |
| 2003/0161146 A1 | 8/2003 | Sharrah et al. | |
| 2005/0157489 A1 | 7/2005 | Oomori et al. | |
| 2005/0200087 A1 | 9/2005 | Vasudeva et al. | |
| 2005/0245183 A1 | 11/2005 | Deshpande et al. | |
| 2005/0247692 A1 | 11/2005 | Axinte et al. | |
| 2005/0267776 A1 | 12/2005 | Selby | |
| 2006/0221602 A1 | 10/2006 | Zick | |
| 2007/0227310 A1 | 10/2007 | Roehm et al. | |
| 2007/0272725 A1 | 11/2007 | Zerweck et al. | |
| 2008/0069694 A1 | 3/2008 | Hernandez et al. | |
| 2008/0179309 A1 | 7/2008 | Markovsky et al. | |
| 2008/0277546 A1 | 11/2008 | Kahn | |
| 2010/0000067 A1 | 1/2010 | Turner et al. | |
| 2010/0053943 A1 | 3/2010 | Zick | |
| 2011/0269336 A1 | 11/2011 | Nashimoto et al. | |
| 2011/0291617 A1 | 12/2011 | Rosenbecker | |
| 2012/0177429 A1 | 7/2012 | Martinez De San Vicente Oliveras | |
| 2012/0269663 A1 | 10/2012 | Kamiya et al. | |
| 2013/0314055 A1 | 11/2013 | Van Der Linde et al. | |
| 2014/0069672 A1* | 3/2014 | Mashiko ................ | B25B 21/00 173/47 |
| 2015/0023786 A1 | 1/2015 | Li et al. | |
| 2015/0136434 A1 | 5/2015 | Aoki et al. | |
| 2015/0137715 A1 | 5/2015 | Brotto et al. | |
| 2015/0194646 A1 | 7/2015 | Yoshinari et al. | |
| 2015/0202753 A1 | 7/2015 | Mittmann | |
| 2015/0256111 A1* | 9/2015 | Forster .................... | H02P 6/14 318/400.27 |
| 2015/0306674 A1 | 10/2015 | Hsiao | |
| 2016/0099575 A1 | 4/2016 | Velderamn | |
| 2017/0072553 A1* | 3/2017 | Bakker ............... | H01M 50/247 |
| 2017/0106520 A1 | 4/2017 | Schadow et al. | |
| 2017/0130912 A1 | 5/2017 | Keller | |
| 2018/0056496 A1* | 3/2018 | Rubens .................... | B44B 7/02 |
| 2018/0076653 A1 | 3/2018 | Forster | |

(56) References Cited

U.S. PATENT DOCUMENTS

| | | | |
|---|---|---|---|
| 2018/0111213 A1 | 4/2018 | Mantes et al. | |
| 2018/0175644 A1 | 6/2018 | Eshleman et al. | |
| 2019/0027002 A1 | 1/2019 | Esenwein et al. | |
| 2019/0134730 A1 | 5/2019 | Teraoka et al. | |
| 2019/0143495 A1 | 5/2019 | Mergener et al. | |
| 2020/0403544 A1* | 12/2020 | Ishikawa | H02P 23/0077 |

FOREIGN PATENT DOCUMENTS

| | | |
|---|---|---|
| CN | 201282155 Y | 7/2009 |
| CN | 201483459 U | 5/2010 |
| CN | 201572729 U | 9/2010 |
| CN | 204496105 U | 7/2015 |
| CN | 104959697 A | 10/2015 |
| CN | 204824920 U | 12/2015 |
| CN | 105785564 A | 7/2016 |
| CN | 205876748 U | 1/2017 |
| CN | 206723102 U | 12/2017 |
| CN | 206860510 U | 1/2018 |
| CN | 207555546 U | 6/2018 |
| CN | 208076825 U | 11/2018 |
| CN | 208106798 U | 11/2018 |
| CN | 208147089 U | 11/2018 |
| CN | 208853894 U | 5/2019 |
| CN | 110242599 A | 9/2019 |
| CN | 209458167 U | 10/2019 |
| CN | 209970389 U | 1/2020 |
| CN | 110802295 A | 2/2020 |
| CN | 210196079 U | 3/2020 |
| CN | 211160516 U | 8/2020 |
| DE | 102016106782 A1 | 10/2017 |
| EP | 0890420 A1 | 1/1999 |
| EP | 2923662 A2 | 9/2015 |
| EP | 3450112 A1 | 3/2019 |
| GB | 2529529 A | 2/2016 |
| JP | 3216040 A2 | 9/1991 |
| JP | 3221703 A2 | 9/1991 |
| KR | 20110104377 A | 9/2011 |
| KR | 20160116140 A | 10/2016 |
| WO | 8910324 A1 | 11/1989 |
| WO | 2013014878 A1 | 1/2013 |
| WO | 2013137480 A2 | 9/2013 |
| WO | 2014050471 A1 | 4/2014 |
| WO | 2019063686 A1 | 8/2020 |

OTHER PUBLICATIONS

Dewalt DCL510 LED worklight—https://www.dewalt.com/products/storage-and-gear/jobsite-lighting-and-flashlights/12v-max-led-worklight/dcl510; Website Accessed Aug. 19, 2020.

Black + Decker RTX Rotary Tool—https://www.amazon.com/BLACK-DECKER-RTX-B-Rotary-Storage/dp/B000MUSLCC; First Available Date listed as Jan. 23, 2007; Website Accessed Aug. 19, 2020.

Black & Decker VPX1404 Lithium-ion Flashlight—https://www.amazon.com/black-decker-vpx1401-lithium-ion-flashlight/dp/b000umjj7s; First Available Date listed as Sep. 1, 2007; Website Accessed Aug. 19, 2020.

Weller WLC100 Soldering Iron; Accessed Aug. 2020.

Ryobi P3100 18 Volt One+ Hybrid Soldering Station—https://www.homedepot.com/p/RYOBI-18-Volt-ONE-Hybrid-Soldering-Station-Tool-Only-P3100/305124211; Website Accessed Aug. 19, 2020.

Ryobi P3105 18 Volt One+ 40 Watt Soldering Iron—https://www.homedepot.com/p/RYOBI-18-Volt-ONE-40-Watt-Soldering-Iron-Tool-Only-P3105/305124212; Website Accessed Aug. 19, 2020.

Ryobi Hybrid LED Light P790 and Soldering Station P3100—https://www.homedepot.com/p/RYOBI-18-Volt-ONE-Hybrid-Soldering-Station-and-Hybrid-LED-Project-Light-Tools-Only-P3100-P790/313765849?mtc=Shopping-B-F_Brand-G-Multi-NA-Multi-NA-Feed-PLA-NA-NA-Catchall_PLA&cm_mmc=Shopping-B-F_Brand-G-Multi-NA-Multi-NA-Feed-PLA-NA-NA-Catchall_PLA-71700000014585962-58700001236285396-92700010802552397&gclid=EAIaIQobChMI95jf0t3w6gIVV.

Milwaukee 2488 Soldering Iron—https://www.milwaukeetool.com/Products/Power-Tools/Specialty-Tools/Heating-Tools/2488-20; Website Accessed Aug. 19, 2020.

Black & Decker CI500S Dual Temperature Soldering and Craft Iron—https://us.amazon.com/Black-Decker-CI500S-Dual-Temperature-Soldering-and-Craft-Iron/dp/B000BASSKI.

Dewalt DCL 150 LED worklight—https://www.dewalt.com/products/storage-and-gear/jobsite-lighting-and-Flashlights/12v-max-led-worklight/dcl510.

Black + Decker RTX Rotary Tool—https://www.amazon.com/BLACK-DECKER-RTX-B-Rotary-Storage/dp/B000MUSLCC.

Black & Decker VPX1404 Lithium-ion Flashlight—https://www.amazon.com/black-decker-vpx1401-lithium-ion-flashlight/dp/b000umjj7s.

Weller WLC100 Soldering Iron.

Ryobi P3100 18 Volt One+ Hybrid Soldering Station—https://www.homedepot.com/p/RYOBI-18-Volt-ONE-Hybrid-Soldering-Station-Tool-Only-P3100/305124211.

Ryobi P3105 18 Volt One+ 40 Watt Soldering Iron—https://www.homedepot.com/p/RYOBI-18-Volt-ONE-40-Watt-Soldering-Iron-Tool-Only-P3105/305124212.

Milwaukee 2488 Soldering Iron—https://www.milwaukeetool.com/Products/Power-Tools/Specialty-Tools/Heating-Tools/2488-20.

EP EESR dated Oct. 16, 2020 in EP application 20189850.9.

* cited by examiner

POWER TOOLS AND POWER TOOLS PLATFORM

CROSS-REFERENCE TO RELATED APPLICATION

This application is a continuation of U.S. application Ser. No. 17/515,921, filed on Nov. 1, 2021, which is a continuation of U.S. application Ser. No. 16/941,154, filed on Jul. 28, 2020, which claims priority and benefit to U.S. Provisional Application No. 62/884,309, filed on Aug. 8, 2019, the entire contents of each are hereby incorporated by reference in their entirety.

BACKGROUND OF THE INVENTION

The present disclosure relates to power tools and a platform for various power tools.

SUMMARY OF EMBODIMENTS OF THE INVENTION

Aspects of the present disclosure relate to a power tool system, tools for the power tool system and tools having a base, a battery pack and a tool. According to an aspect, there is an exemplary embodiment of a power tool system, the system including a removable battery pack. The system further includes a first tool, the first tool including a first base housing that is selectively engageable with the removable battery pack and a first tool portion connected to the first base housing by a first connecting section. The first tool base housing houses a first controller that provides a proportional power delivery system for the first tool. The first tool base housing further comprises a first actuator for providing user control of the first tool. The system further includes a second tool, the second tool including a second base housing that is selectively engageable with the removable battery pack and a second tool portion connected to the second base housing by a second connecting section. The second tool base housing houses a second controller that provides a proportional power delivery system for the second tool. The second tool base housing further comprises a second actuator for providing user control of the second tool.

The first tool base housing may further house a first circuit board and the first controller is mounted on the first circuit board.

The second tool base housing may further house a second circuit board and the second controller is mounted on the second circuit board.

The battery pack may be inserted into the first tool base housing along a first plane.

The first circuit board may be disposed in a first circuit board plane which is substantially parallel to the first plane.

The battery pack may be inserted into the second tool base housing along a second plane.

The second circuit board may be disposed in a second circuit board plane which is substantially parallel to the second plane.

The first actuator may have the same configuration as the second actuator.

The first circuit board may have the same configuration as the second circuit board.

The first controller may provide the proportional power delivery in the range of 80 W to 120 W pulse-width-modulation and the second controller provides the proportional power delivery in the range of 80 W to 120 W pulse-width-modulation.

The first controller and the second controller may provide the same proportional power delivery.

The first tool may be a rotary tool and the second tool may be a soldering tool.

The first connecting section may comprise a cord.

The battery pack may serve as a weighted base for the first tool.

According to another aspect, there is an exemplary embodiment of a power tool system, the system comprising a removable battery pack and a first tool. The first tool includes a first base housing that is selectively engageable with the removable battery pack and a first tool portion connected to the first base housing by a first cord. The first tool base housing houses a first controller that provides a proportional power delivery system for the first tool. The first tool base housing further comprises a first actuator for providing user control of the first tool. The system further includes a second tool, the second tool including a second base housing that is selectively engageable with the removable battery pack and a second tool portion connected to the second base housing by a second cord. The second tool base housing houses a second controller that provides a proportional power delivery system for the second tool. The second tool base housing further comprises a second actuator for providing user control of the second tool.

The first tool base housing may further house a first circuit board and the first controller is mounted on the first circuit board.

The second tool base housing may further house a second circuit board and the second controller may be mounted on the second circuit board.

The battery pack may be inserted into the first tool base housing along a first direction or plane. The first circuit board may be disposed in a first circuit board plane which is substantially parallel to the first plane.

The first circuit board may have the same configuration as the second circuit board.

The first controller may provide the proportional power delivery in the range of 80 W to 120 W pulse-width-modulation and the second controller provides the proportional power delivery in the range of 80 W to 120 W pulse-width-modulation.

The first controller and the second controller may provide the same proportional power delivery.

The first tool may be a rotary tool and the second tool may be a soldering tool.

The battery pack may serve as a weighted base for the first tool.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

FIGS. 1-7 illustrate an exemplary embodiment of a power tool system. The power tool system includes a variety of tools that utilize a common battery pack 100. The battery pack 100 is a removable power tool battery pack and may be of the type shown in, for example, U.S. Pat. Nos. 7,598,705; 7,661,486; or U.S. Patent Application Publication No. 2018/0331335. U.S. Pat. Nos. 7,598,705; 7,661,486; and U.S. Patent Application Publication No. 2018/0331335 are hereby incorporated by reference.

Figure 2:
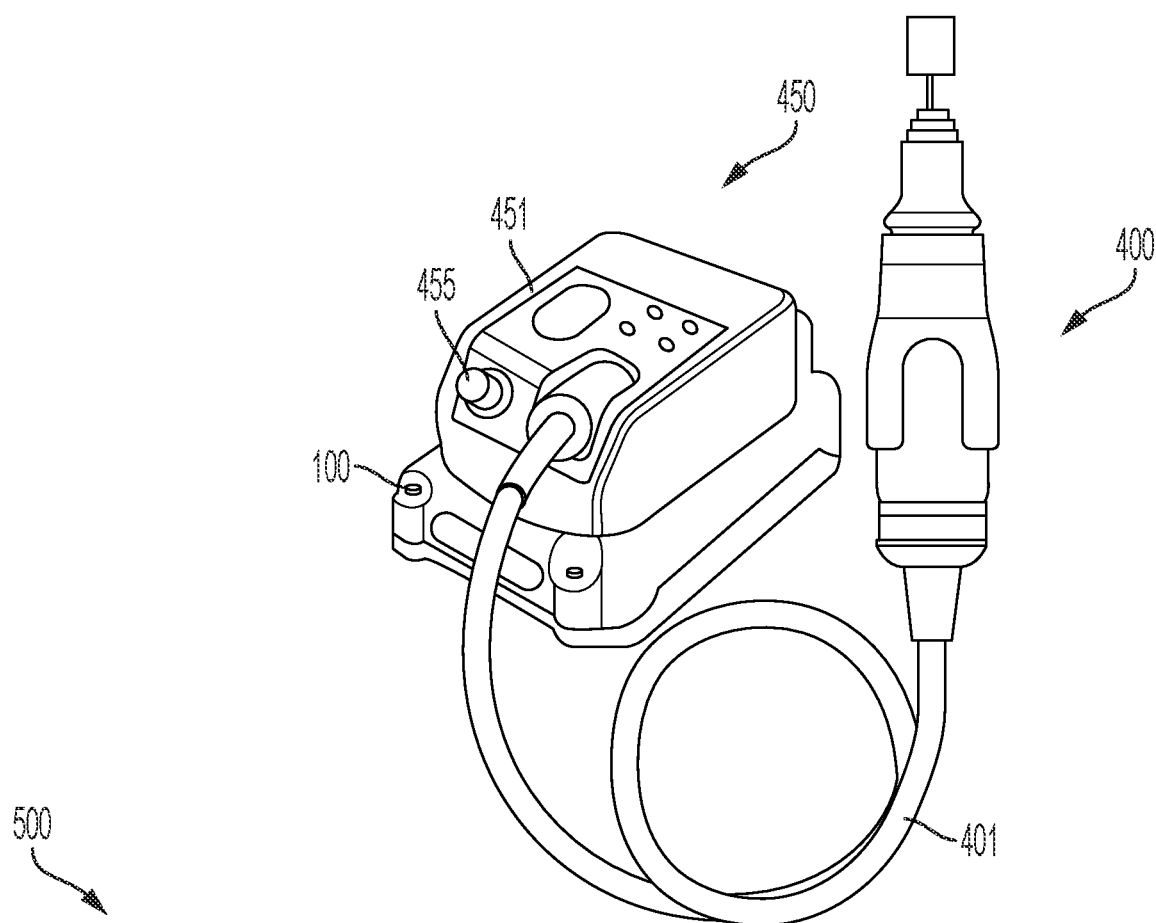
FIG. 2 is a perspective view of an exemplary embodiment of a rotary tool.
Figure 3:
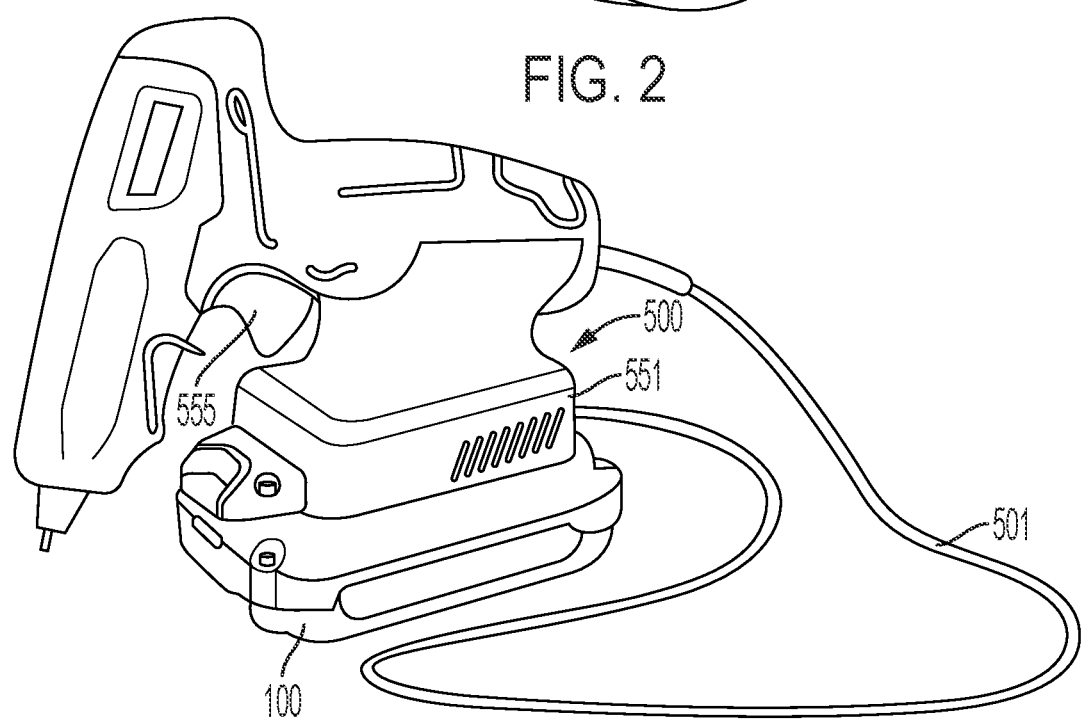
FIG. 3 is a perspective view of an exemplary embodiment of a glue gun.
Figure 4:
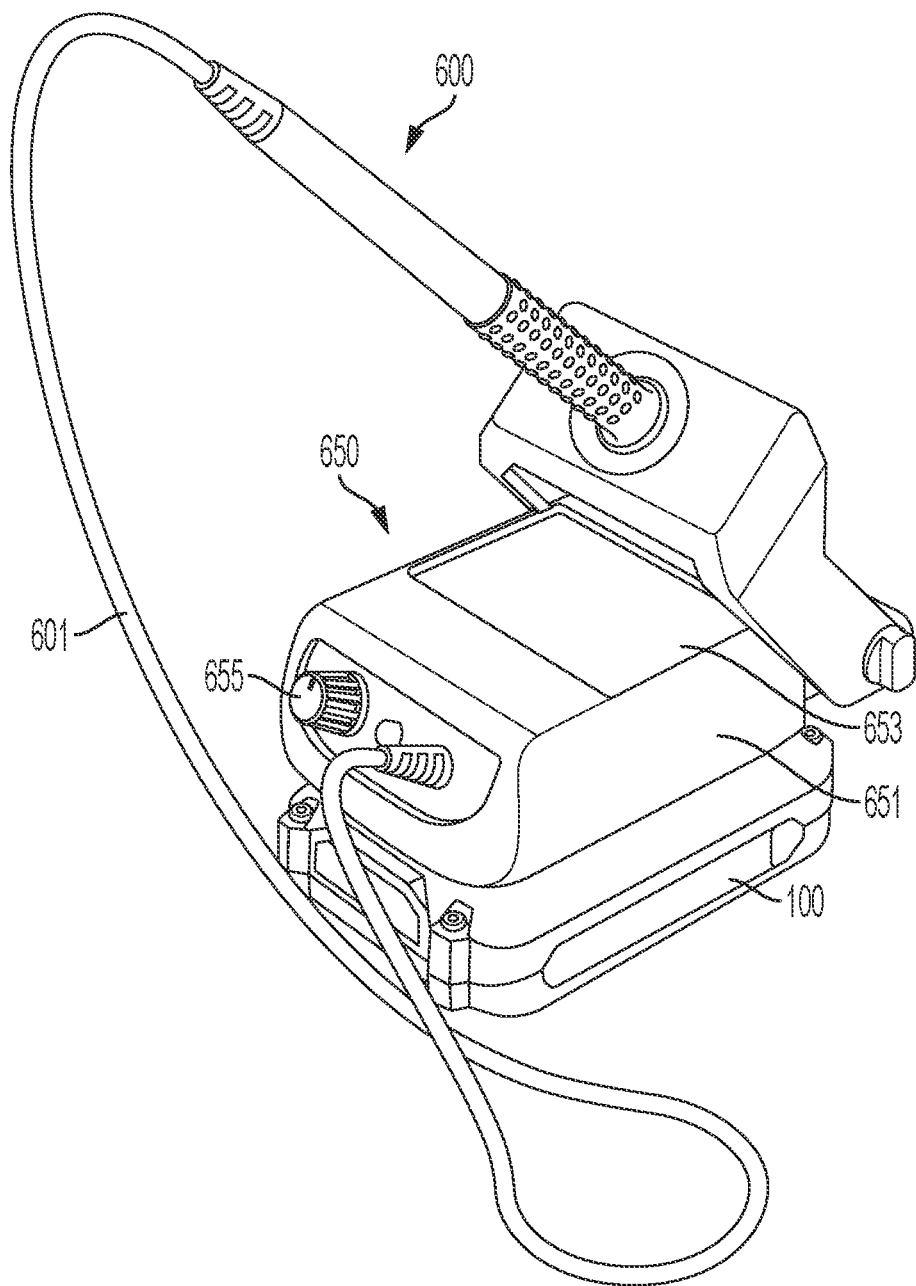
FIG. 4 is a perspective view of an exemplary embodiment of a soldering iron.
Figure 5:
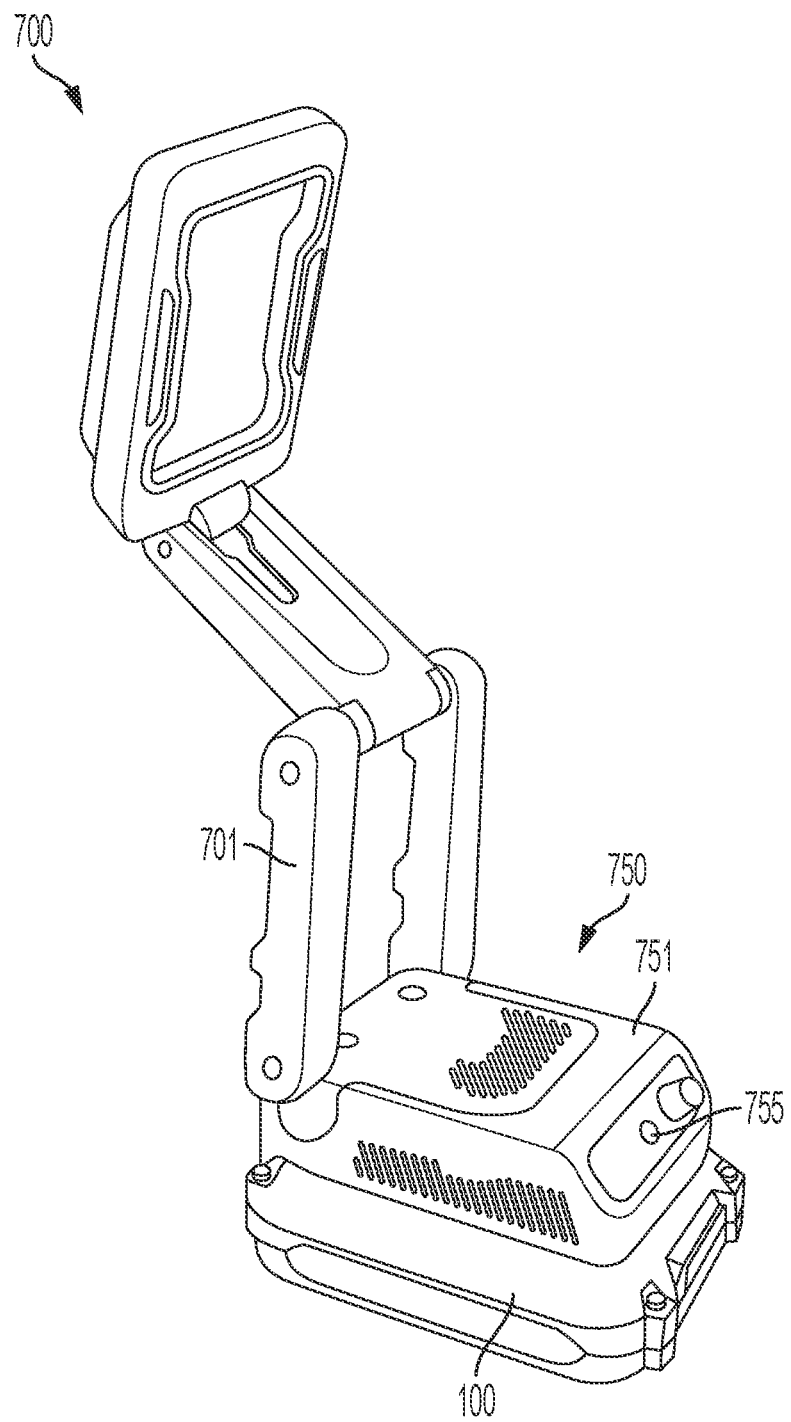
FIG. 5 is a perspective view of an exemplary embodiment of a lamp light.
Figure 6:
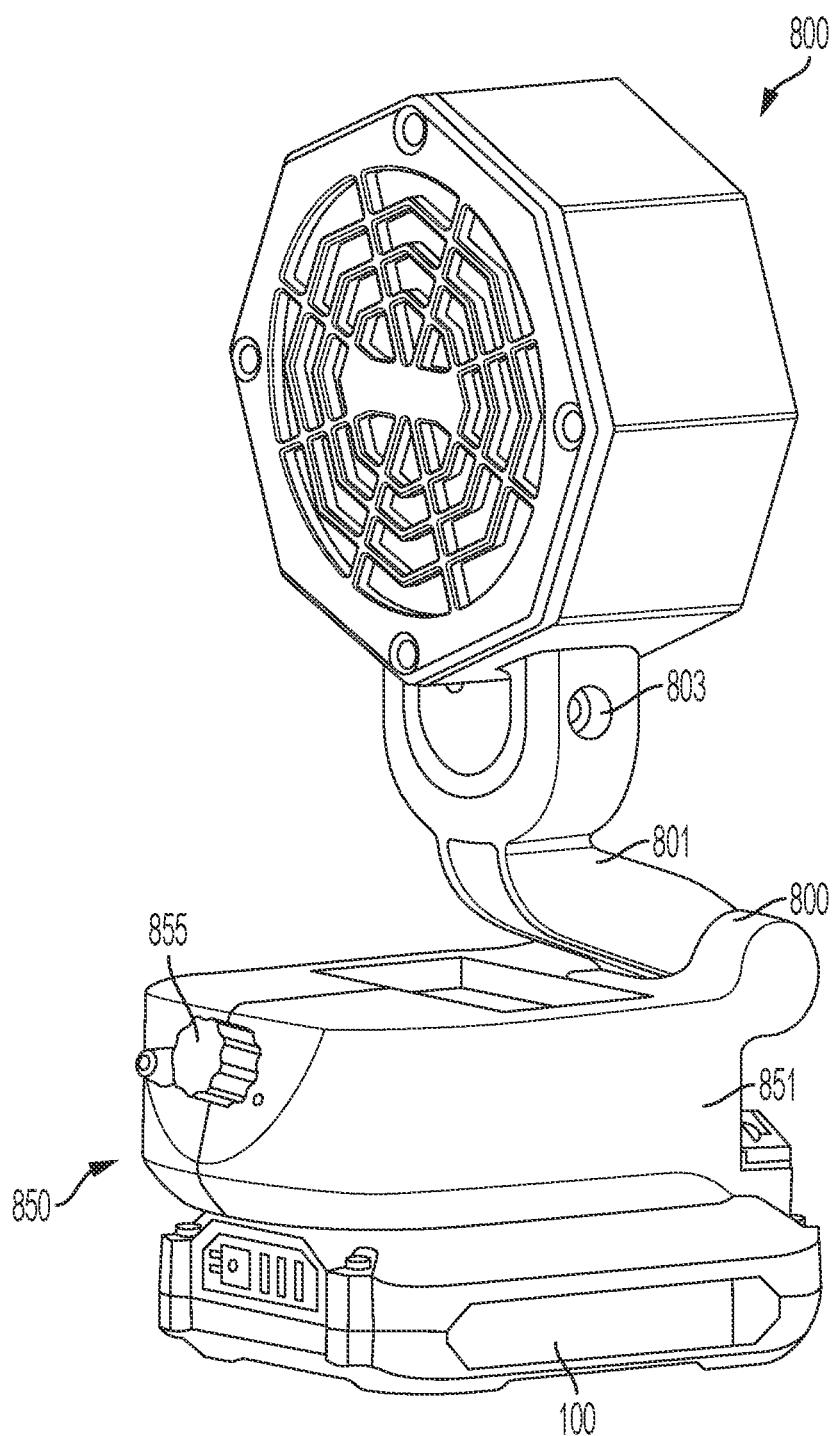
FIG. 6 is a perspective view of an exemplary embodiment of a fan.

Each tool in the power tool system of the exemplary embodiment also includes a common base 200. Each tool then is built incorporating this common base 200. For example, the specific tools may include a rotary tool 400, as shown in FIG. 2; a hot glue gun 500, as shown in FIG. 3; a soldering iron 600, as shown in FIG. 4; a lamp light 700, as shown in FIG. 5; or a fan 800, as shown in FIG. 6. Each of these tools is also powered by a battery pack 100.

Figure 1:
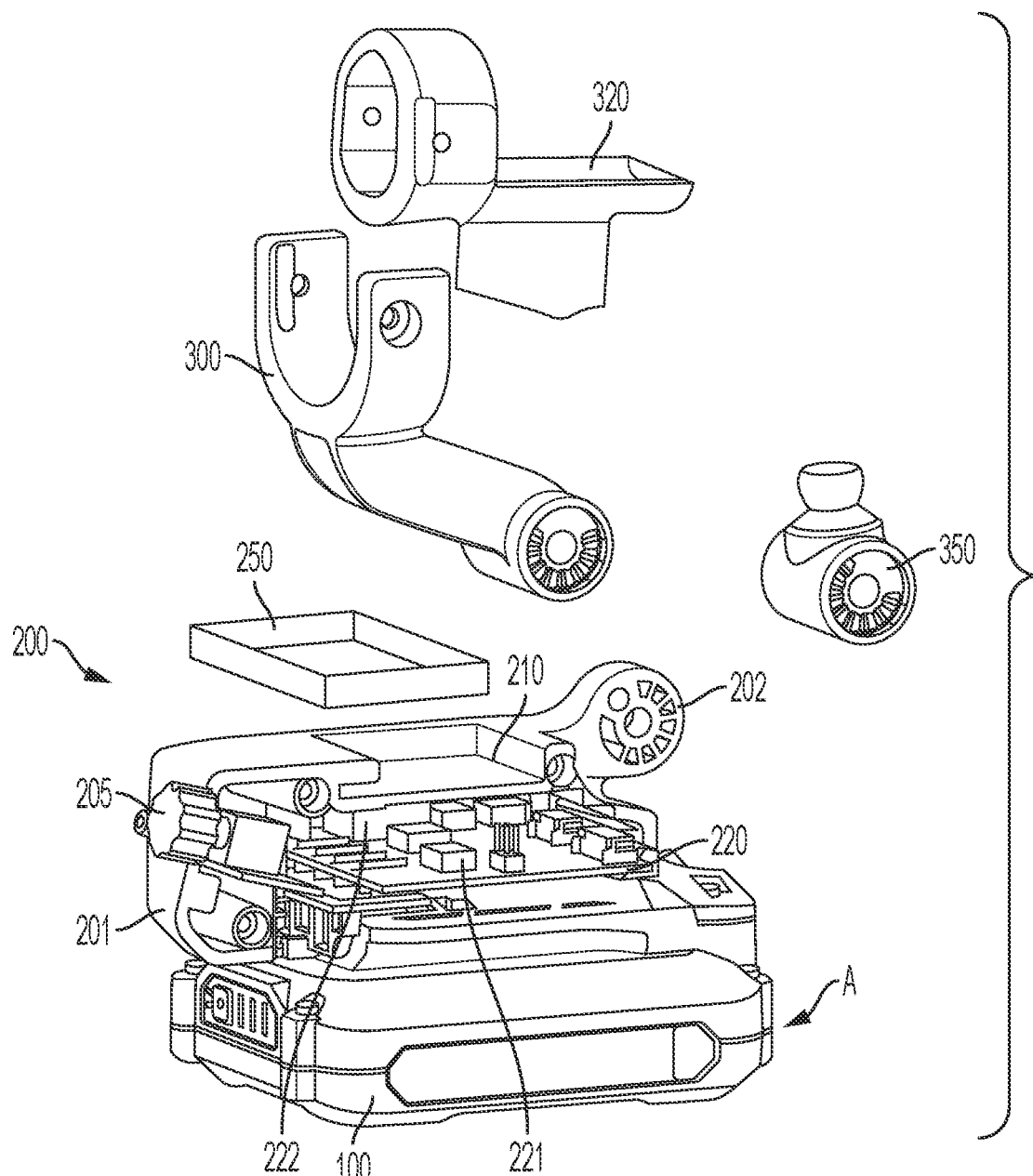
FIG. 1 is an illustrative view of a battery pack and common base features according to an exemplary embodiment of the present application.

FIG. 1 illustrates components of the base 200. FIG. 1 is a partially exploded view and one half of a housing 201 of the common base 200 is removed to illustrate internals. As is shown in FIG. 1, the common base 200 comprises a housing 201. The housing 201 is removably attachable to the power tool battery pack 100. There is an actuator 205 on the front of the housing 201. The actuator 205 may be used to turn on or off one of the variety of tools. For example, the actuator 205 may be used to turn on or off the rotary tool 400, lamp light 700, fan 800, etc. In the exemplary embodiment, the actuator 205 is a rotatable knob, but other actuators are possible. The actuator 205 may provide a variable input. For example, turning the knob more may increase the speed or intensity of the tool. For example, the knob may be used to control the fan 800 rotation or rotary tool 400 rotation at different speeds. Similarly, the knob may control the intensity of the light for the lamp light 700. In other embodiments the actuator 205 could simply turn a tool on and off. Additionally, the actuator 205 may in some tools serve only as an on and off actuator and in other tools provide different settings, such as different speed or intensity settings.

The housing 201 also houses a circuit board 220 including a controller 221. The controller 221 can provide a proportional 100 W (watts) PWM (pulse-width-modulation) power delivery system that allows for the setting of speed, temperature control, lighting control or fan speed, depending upon the particular tool. The proportional pulse-width-modulation power delivery may be in the range of 80 W to 120 W. pulse-width-modulation power delivery may be in the range of 50 W to 150 W. The circuit board 220 may be a printed circuit board. The controller 221 may include a microprocessor. There may be a memory 222 on the circuit board 220 and the controller 221 may itself have a memory component. Other components may also be mounted on the circuit board 220 such as sensors, resistors or charge and discharge controls. The circuit board 220, controller 221, memory 222 and the provided pulse-width-modulation power delivery may be the same for each of the tools. That allows the same design to be used for a variety of different tools 400, 500, 600, 700, 800. Each of the tools 400, 500, 600, 700, 800 has a base that is similar to the common base 200.

As is further shown in FIG. 1, the housing 201 includes a recess 210. When used for some tools, the recess can hold a stamped aluminum tray 250 for holding a solder sponge or other component. Additionally, the housing 201 has a pivot projection 202 which allows pivoting attachment to various tools. The pivot projection 202 attaches to tool arm rest 300. The tool arm rest 300 may be used to hold a variety of different tools. In other embodiments, the pivot projection 202 may attach to an alternate tool holder 350. In other embodiments there are additional tool specific features, such as a tool rest 320.

As shown in FIGS. 2-6, the battery pack 100 serves as a weighted base for each of the tools 400, 500, 600, 700, 800. The battery pack 100 may be placed on a stable surface, such as a flat horizontal surface made by a table or floor and remain in place. The tools 400, 500, 600, 700, 800 each have working portions which can be remote from the battery pack 100 and the respective bases and base housings. The working portions of the tools may be connected to the base, base housings and battery packs 100 by a connection section. The connection section may in some instances be a cord, as in the rotary tool 400, glue gun 500 and soldering iron 600. In other instances the connection section may be a movable stand, such as with the light 700 and the fan 800. In each instance, the common control hardware and a similar housing can be used to connect to the battery pack 100 serving as a weighted base of the product. At the same time, each tool can perform work away from the base and battery pack 100 owing to the connection section.

As is shown in FIG. 1, the battery pack 100 is connected to the base 200 in a direction A. The PCB 220 is disposed in a plane parallel to the direction A. The PCB 220 is also disposed in a plane parallel to a bottom of the battery pack 100 and a central major plane of the battery pack 100.

FIG. 2 illustrates the rotary tool 400. The rotary tool 400 is powered by the removable battery pack 100. The rotary tool 400 has a base 450 with a base housing 451. The base housing 451 houses the same components as the base housing 201 shown in FIG. 1. In particular, the base housing 451 houses a printed circuit board (PCB) 220 on which a controller 221 and a memory 222 are mounted. The user operated actuator 455 is connected to the controller 221 through the PCB 220. As shown in FIG. 2, the rotary tool 400 is connected to the base housing 451 by a cord 401 which carries power to the rotary tool 400. The cord 401 allows the rotary tool 400 to be used and positioned remote from the base housing 451 and in a variety of orientations.

FIG. 3 illustrates the glue gun 500. The glue gun 500 is also powered by the removable battery pack 100. The glue gun 500 has a base 550 with a base housing 551. The base housing 551 houses the same components as the base housing 201 shown in FIG. 1. In particular, the base housing 551 houses a printed circuit board (PCB) 220 on which a controller 221 and a memory 222 are mounted. The user operated actuator 555 is connected to the controller 221 through the PCB 220. In this case, the user operated actuator 555 is on the glue gun housing. As shown in FIG. 3, the glue gun 500 is connected to the base housing 551 by a cord 501 which carries power to the rotary tool 500. The cord 501 allows the glue gun 500 to be used and positioned remote from the base housing 551 and in a variety of orientations. The glue gun 500 may rest on tool rest 520.

FIG. 4 illustrates the soldering iron 600. The soldering iron 600 is powered by the removable battery pack 100. The soldering iron 600 has a base 650 with a base housing 651. The base housing 651 houses the same components as the base housing 201 shown in FIG. 1. In particular, the base housing 651 houses a printed circuit board (PCB) 220 on which a controller 221 and a memory 222 are mounted. The user operated actuator 655 is connected to the controller 221 through the PCB 220. In this case, the user operated actuator 655 controls the temperature of the soldering iron 600. As shown in FIG. 4, the soldering iron 600 is connected to the base housing 651 by a cord 601 which carries power to the soldering iron 600. The housing 651 includes a recess for a sponge 653. The cord 601 allows the soldering iron 600 to be used and positioned remote from the base housing 651 and in a variety of orientations. The soldering iron 600 is shown in FIG. 4 resting in a tool rest 620. The tool rest 620 is pivotably attached to the base housing 651.

FIG. 5 illustrates the lamp light 700. The lamp light 700 is powered by the removable battery pack 100. The lamp light 700 has a base 750 with a base housing 751. The base housing 751 houses the same components as the base housing 201 shown in FIG. 1. In particular, the base housing 751 houses a printed circuit board (PCB) 220 on which a controller 221 and a memory 222 are mounted. The user operated actuator 755 is connected to the controller 221 through the PCB 220. The user operated actuator 755 can turn the light on and off and adjust the brightness of the light 700. As shown in FIG. 5, the lamp light 700 includes a collapsible stand 701 for changing the orientation of the light given off by the lamp light 700.

FIG. 6 illustrates the fan 800. The fan 800 is powered by the removable battery pack 100. The fan 800 has a base 850 with a base housing 851. The base housing 851 houses the same components as the base housing 201 shown in FIG. 1. In particular, the base housing 851 houses a printed circuit board (PCB) 220 on which a controller 221 and a memory 222 are mounted. The user operated actuator 855 is connected to the controller 221 through the PCB 220. The user operated actuator 855 can turn the fan 800 on and off and control the speed of rotation of the fan 800. As shown in FIG. 6, the fan 800 includes a pivoting stand 801 for changing the orientation of the fan 800. The pivoting stand 801 includes two pivots 802 and 803.

Figure 7:
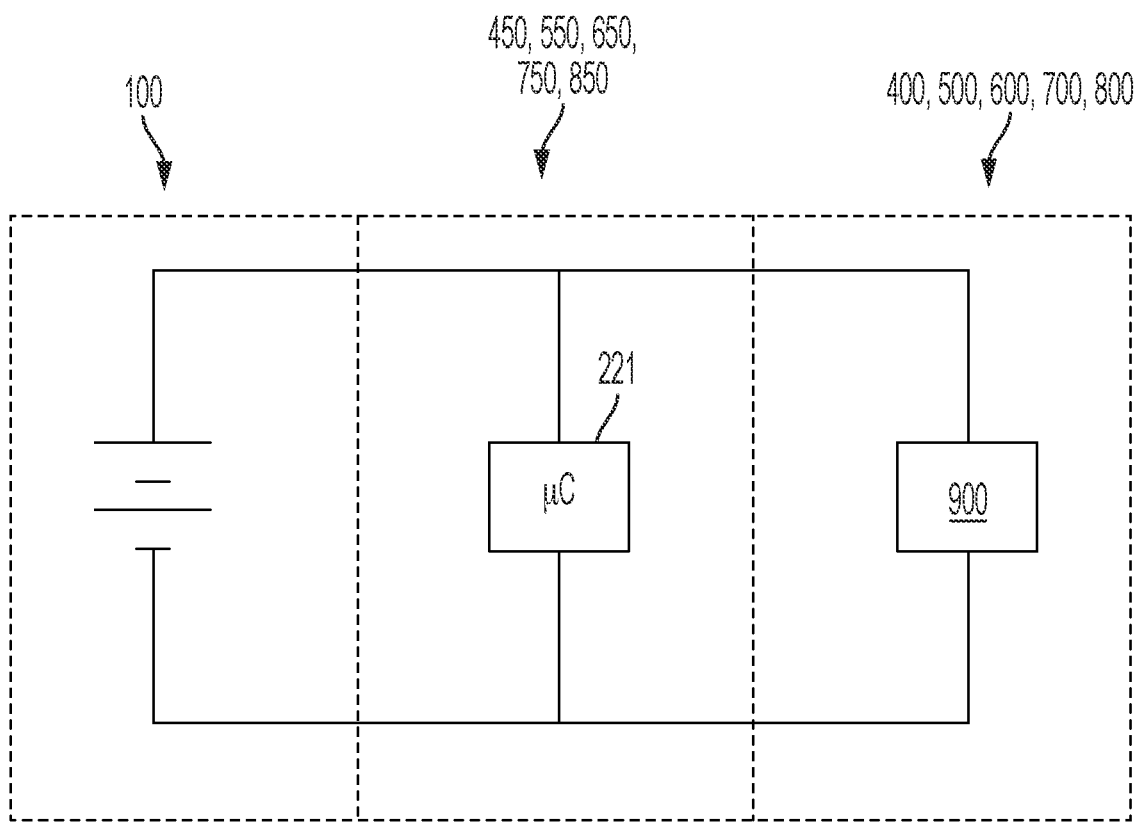
FIG. 7 is a schematic of a battery pack, base and tool according to an exemplary embodiment of the present application.

FIG. 7 is a schematic illustration of the battery pack 100, base 450, 550, 650, 750, 850 and the various tools 400, 500, 600, 700, 800. As shown, the battery pack 100 is connected to the controller 221. As discussed above, the controller 221 provides a PWM power delivery to the tools 400, 500, 600, 700, 800, such as a tool specific component 900. The tool specific component 900 varies depending on the particular tool. For example, the tool specific component 900 may be a motor in the event of the rotary tool 400 and the fan 800. The motor would be driven to drive the rotary tool 400 or the fan blades of the fan 800. In the case of the lamp light 700, the tool specific component 900 may be one or more light-emitting-diodes (LEDs). The LEDs are driven by the power supplied by the controller 221 from the battery pack 100 to produce the light of the lamp light 700. For the glue gun 500 and the soldering iron 600, the tool specific component 900 may be a heating element such as a resistive heating element. As will be appreciated, the heating element will provide the heat for melting the glue for the glue gun 500 or allowing soldering by the soldering iron 600.

In addition to the tools shown in FIGS. 2-6, other small detail tools may be part of the system. For example, small die grinders, chisels, polishers and reciprocating knives.

As will be appreciated, the removable battery pack 100 is a power tool battery pack. Accordingly, the battery pack 100 may also power other power tools including larger tools such as a drill, impact driver, circular saw, etc. which may not share the common base, electronics and connection section as the embodiments of the present application.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

Additionally, while the exemplary embodiment is described with respect to an oscillating tool, the methods and configurations may also apply to or encompass other power tools such as other tools holding accessories.

What is claimed is:
1. A tool system comprising:
   a power tool battery pack;
   a fan, the fan comprising a fan base portion and a fan working portion;
   a soldering iron, the soldering iron comprising a soldering iron base portion and a soldering iron working portion;
   a glue gun, the glue gun comprising a glue gun base portion and a glue gun working portion; and
   a rotary tool, the rotary tool comprising a rotary tool base portion and a rotary tool working portion;
   wherein the power tool battery pack is configured to be selectively engaged with each of the fan, the soldering iron, the glue gun and the rotary tool;
   wherein when the power tool battery pack is engaged with the fan, the power tool battery pack serves as a weighted base for the fan;
   wherein when the power tool battery pack is engaged with the soldering iron, the power tool battery pack serves as a weighted base for the soldering iron;
   wherein when the power tool battery pack is engaged with the glue gun, the power tool battery pack serves as a weighted base for the glue gun;

wherein when the power tool battery pack is engaged with the rotary tool, the power tool battery pack serves as a weighted base for the rotary tool;

wherein the soldering iron working portion is configured to perform work away from the power tool battery pack;

wherein the rotary tool working portion is configured to perform work away from the power tool battery pack; and wherein the glue gun working portion is configured to perform work away from the power tool battery pack.

2. The tool system of claim 1, wherein the fan comprises a fan connection section;
wherein the fan connection section connects the fan base portion to the fan working portion.

3. The tool system of claim 2, wherein the glue gun working portion comprises a heating element.

4. The tool system of claim 3, wherein the soldering iron working portion comprises a heating element.

5. The tool system of claim 4, wherein the fan connection section comprises a pivoting stand.

6. The tool system of claim 5, wherein the fan connection section comprises a first pivot and a second pivot.

7. The tool system of claim 6, wherein the fan base portion comprises a fan base portion housing and a fan controller housed in the fan base portion housing.

8. The tool system of claim 7, wherein the soldering iron base portion comprises a soldering iron base portion housing and a soldering iron controller housed in the soldering iron base portion housing.

9. The tool system of claim 8, wherein the rotary tool base portion comprises a rotary tool base portion housing and a rotary tool controller housed in the rotary tool base portion housing.

10. The tool system of claim 9, wherein the soldering iron base portion comprises a soldering iron base portion housing and a soldering iron controller housed in the soldering iron base portion housing.

11. The tool system of claim 10, wherein the fan base portion comprises a fan actuator.

12. The tool system of claim 11, wherein the rotary tool base portion comprises a rotary tool actuator.

13. A tool system comprising:
a power tool battery pack;
a fan, the fan comprising a fan base portion and a fan working portion;
a soldering iron, the soldering iron comprising a soldering iron base portion and a soldering iron working portion;
a glue gun, the glue gun comprising a glue gun base portion and a glue gun working portion; and
a rotary tool, the rotary tool comprising a rotary tool base portion and a rotary tool working portion;
wherein the power tool battery pack is configured to be selectively engaged with each of the fan, the soldering iron, the glue gun and the rotary tool;
wherein when the power tool battery pack is engaged with the fan, the power tool battery pack serves as a weighted base for the fan;
wherein when the power tool battery pack is engaged with the soldering iron, the power tool battery pack serves as a weighted base for the soldering iron;
wherein when the power tool battery pack is engaged with the rotary tool, the power tool battery pack serves as a weighted base for the rotary tool;
wherein the soldering iron working portion is configured to perform work away from the power tool battery pack;
wherein the rotary tool working portion is configured to perform work away from the power tool battery pack
wherein the glue gun working portion is configured to perform work away from the power tool battery pack; and
wherein the glue gun working portion comprises a heating element.

14. The tool system of claim 13, wherein the fan comprises a fan connection section;
wherein the fan connection section connects the fan base portion to the fan working portion; and
wherein the fan connection section comprises a first pivot and a second pivot.

15. The tool system of claim 13, wherein the fan base portion comprises a fan base portion housing and a fan controller housed in the fan base portion housing.

16. The tool system of claim 13, wherein the rotary tool base portion comprises a rotary tool base portion housing and a rotary tool controller housed in the rotary tool base portion housing.

17. A tool system comprising:
a power tool battery pack;
a fan, the fan comprising a fan base portion, a fan working portion and a fan connection section;
a soldering iron, the soldering iron comprising a soldering iron base portion and a soldering iron working portion;
a glue gun, the glue gun comprising a glue gun base portion and a glue gun working portion; and
a rotary tool, the rotary tool comprising a rotary tool base portion and a rotary tool working portion;
wherein the power tool battery pack is configured to be selectively engaged with each of the fan, the soldering iron, the glue gun and the rotary tool;
wherein when the power tool battery pack is engaged with the fan, the power tool battery pack serves as a weighted base for the fan;
wherein when the power tool battery pack is engaged with the glue gun, the power tool battery pack serves as a weighted base for the glue gun;
wherein when the power tool battery pack is engaged with the rotary tool, the power tool battery pack serves as a weighted base for the rotary tool;
wherein the soldering iron working portion is configured to perform work away from the power tool battery pack;
wherein the rotary tool working portion is configured to perform work away from the power tool battery pack;
wherein the glue gun working portion is configured to perform work away from the power tool battery pack; and
wherein the fan connection section comprises a pivoting stand.

18. The tool system of claim 17, wherein the fan connection section comprises a first pivot and a second pivot.

19. The tool system of claim 17, wherein the fan base portion comprises a fan base portion housing and a fan controller housed in the fan base portion housing.

20. The tool system of claim 17, wherein the soldering iron base portion comprises a soldering iron base portion housing and a soldering iron controller housed in the soldering iron base portion housing.

* * * * *